United States Patent [19]
Taylor et al.

[11] Patent Number: 5,849,197
[45] Date of Patent: Dec. 15, 1998

[54] REGENERATION OF PULP LIQUORS

[75] Inventors: Leslie James Taylor, Doncaster, Australia; David John Harris, Albuquerque, N. Mex.

[73] Assignee: Amcor Limited, Victoria, Australia

[21] Appl. No.: 612,962

[22] PCT Filed: Mar. 17, 1995

[86] PCT No.: PCT/AU95/00150

§ 371 Date: Aug. 5, 1996

§ 102(e) Date: Aug. 5, 1996

[87] PCT Pub. No.: WO95/25197

PCT Pub. Date: Sep. 21, 1995

[30] Foreign Application Priority Data

Mar. 17, 1994 [AU] Australia ................................ PM4527

[51] Int. Cl.⁶ .................................................. B01D 61/00
[52] U.S. Cl. .......................... 210/652; 210/651; 210/650; 210/641; 210/805; 210/928; 162/29
[58] Field of Search ...................... 210/652, 650, 210/641, 805, 928, 710, 748, 727, 601; 162/29, 30, 189, 190

[56] References Cited

U.S. PATENT DOCUMENTS

| 3,873,414 | 3/1975 | Rocher et al. | 162/30 |
|---|---|---|---|
| 4,155,845 | 5/1979 | Ancelle et al. | 162/29 |
| 4,173,532 | 11/1979 | Keoteklian | 210/727 |
| 4,990,260 | 2/1991 | Pisani | 210/748 |
| 5,290,454 | 3/1994 | Dorica et al. | 210/710 |
| 5,385,664 | 1/1995 | Oinuma et al. | 210/266 |
| 5,470,481 | 11/1995 | Modell et al. | 210/652 |
| 5,558,774 | 9/1996 | Tonelli et al. | 210/622 |

FOREIGN PATENT DOCUMENTS

| 1 268 907 | 5/1990 | Canada . |
| 24 33 325 | 1/1976 | Germany . |
| 40 42 224 | 7/1992 | Germany . |
| 58-143883 | 8/1983 | Japan . |
| 80 02574 | 11/1980 | WIPO . |

OTHER PUBLICATIONS

Japanese Abstract 5–302290, dated Nov. 16, 1993, on "Method for Treating Waste Liquor of Pulp Production,", Mitsubishi Paper Mills Ltd.

Japanese Abstract 5,247868, dated Sep. 24, 1993, on "Treatment of Waste Water in Production of Pulp", Mitsubishi Paper Mills Ltd.

Japanese Abstract 52–35261, dated Mar. 18, 1977, on "Paper Pump Drainage Treatment Method", Daicel K.K.

*Primary Examiner*—Ana Fortuna
*Attorney, Agent, or Firm*—Bell Seltzer Intellectual Property Law Group of Alston & Bird LLP

[57] ABSTRACT

A paper mill and method of producing paper from waste paper in which no liquid effluent is produced, and wherein the spent treatment liquors are subjected to an oxidative treatment, microfiltration, and reverse osmosis.

5 Claims, 4 Drawing Sheets

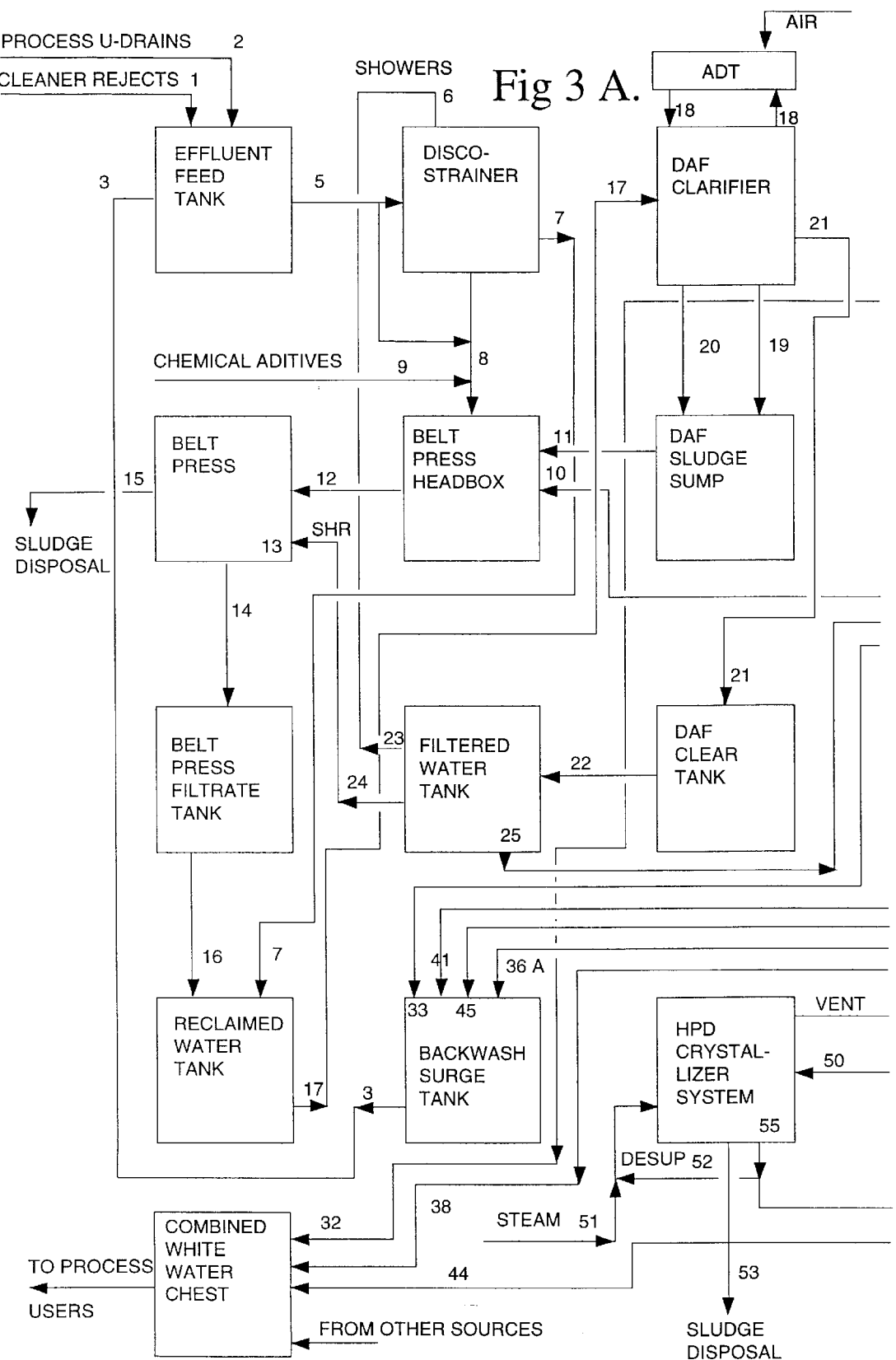

REGENERATION OF PULP LIQUORS

This invention relates to the manufacture of paper and paperboard and in particular, from recycled paper or paperboard materials.

Conventional paper mill systems are run so that process waters are recycled many times during the production of paper and paperboard. Eventually, however, the concentrations of dissolved inorganic salts and organic materials in the process waters build up to a level where further recycling is impractical without having an adverse effect on the quality of the paper produced. These impurities generally have a high BOD (biological oxygen demand) and a high COD (chemical oxygen demand). Additionally, the dissolved materials promote unacceptable levels of corrosion in process equipment and growth of bacterial slimes, leading to blockage of pipes and sprays. These restrictions necessitate the discharge of large volumes of waste water into conventional waste water treatment plants, located either on the site of the mill itself, or at some remote site, which is often a municipal sewage treatment plant. To make up for this discharge paper mills must also take in large volumes of fresh water for process use. Consequently, paper making which utilises conventional waste water treatment techniques places a heavy demand on often scarce fresh water resources and also on the waste water treatment systems themselves.

The process of papermaking (whether from virgin pulp or wastepaper) involves diluting refined cellulose fibres with massive quantities of water, forming the fibres into a sheet in the forming section of a paper machine, then progressively removing the water until the result is a dry sheet of paper. Vegetable starches are frequently added to the suspension of fibres or to the sheet at an intermediate stage in the drying process to increase the strength of the paper or to reduce the rate at which the paper absorbs water.

In addition to the starch, chemicals are employed in ancillary treatments i.e. acids and caustic soda for water pH control, and flocculants and retention aids to improve the retention of the cellulose fibres and other components in the papermaking process. In many cases the water soluble chemical sodium sulphate is generated as a by-product of the use of aluminium sulphate in the sizing process.

Since not all the cellulose fibre or chemicals are retained in the sheet of paper, the water becomes contaminated by this non-retained material, and eventually reaches a level of contamination where it has to be rejected from the system as effluent.

The nature of this contamination can be categorised into the following forms:
1. Suspended solids (visible particles) both organic and inorganic
2. Dissolved solids (again, organic and inorganic, but in the main dissolved mineral salts)
3. Bacteria A proportion of both forms of solids (BOD—Biological oxygen demand and COD—Chemical oxygen demand) require oxidation to convert them to inert and harmless substances.

Paper and paperboard mills in the USA in the period from 1956 to 1966 typically discharged between 3800 and 53000 liters of water per ton of production, the average for the industry being 17680 liters per ton. In 1982 the United States Environmental Protection Authority (EPA) developed guidelines which outlined industry targets to be between 1130 to 41300 liters per ton, the industry average being 17400.

Since the introduction of the EPA development document, 1988/89 industry operations have reduced water discharges to between 530 to 27820 liters per ton with the current average usage being 9530.

Whilst a typical paper mill recycles process water many times in the production of paper and paperboard, eventually the water reaches a level of contamination which precludes its further use and at this stage, the process water, often termed excess water, is discharged from the mill as effluent.

Historically the EPA has regulated these discharges, particularly in terms of $BOD_5$ (Five Day Biological Oxygen Demand) and TSS (Total Suspended Solids) as outlined below.

| Raw Effluent Characteristics | | | |
|---|---|---|---|
| | Historical 1956–66 | EPA Development 1981 | 1988–89 Operations |
| $BOD_5$ lbs per ton (average) | 10.2 to 99 29.4 | 1.9 to 135 18.4 | 8.8 to 39.7 22.7 |
| TSS lbs per ton (average) | 4.5 to 101 36.5 | 0.9 to 95.3 20.8 | 1.7 to 44.5 15.7 |

Attempts at purifying effluents have been made as exemplified in U.S. Pat. No. 2,897,148. There has been at least one attempt to design a paper mill having zero liquid discharge but this was in a mill converting wood chips into paper pulp. The complexity of the composition of effluents in a recycled paper mill is much greater because of the presence of inks, sizing agents and other chemicals in the paper to be recycled.

It is an object of this invention to provide a process and a paper mill for making paper which involves treating paper mill process water that would normally be liquid effluent discharge, removing the contamination and then returning the water to the mill in "fresh" condition, such that there is no liquid effluent.

To this end the present invention provides a method of producing paper from waste paper with the production of no liquid effluent which includes the steps of treating the waste paper with aqueous treatment liquors, recovering converted paper and spent treatment liquors, characterized in that the spent treatment liquors are subsequently:
- subjected to an oxidative treatment which produces a sludge;
- separating the liquid phase from the sludge;
- subjecting the separated liquid phase to reverse osmosis treatment;
- and reusing all of the treated liquid phase to form fresh aqueous treatment liquor.

It is preferred that the separated liquid phase is subjected to microfiltration prior to reverse osmosis treatment. In a preferred embodiment the invention provides a method which includes the steps of:
- removing suspended solids from spent treatment liquors;
- optionally treating the spent treatment liquors in a clarifier;
- passing the spent treatment liquors to a cyclic activated sludge reaction system for oxidative treatment which produces a sludge;
- separating the liquid phase from the sludge;
- subjecting the separated liquid phase to a continuous microfilter to remove suspended particles;
- subjecting the microfiltered water to reverse osmosis treatment to concentrate dissolved solids and produce a treated liquid phase and a concentrated salt solution; and crystallizing the dissolved salts in an evaporation unit to produce a solid waste.

It is preferred that the filtration unit for removing suspended solids from spent treatment liquors comprises a series of filtration means such as disk type filtration means, flotation type filtration means and/or sand type filtration means.

Preferably the spent treatment liquours are subjected to a clarifier prior to oxidation of the organic materials.

This invention is partly predicated on the discovery that it is advantageous to remove a substantial portion of the organic contaminants prior to and separately from the removal of the inorganic contaminants.

Oxidation of inorganic materials may also occur in the biological treatment unit however, most of these oxidised materials remain in solution, in contrast to the majority of the oxidised organic materials which are removed in a separable sludge.

This invention also provides a paper mill for producing paper from waste paper in which no liquid effluent is produced which includes the steps of treating the waste paper with aqueous treatment liquors and recovering converted paper and spent treatment liquors comprising:

a biological treatment unit to oxidize a substantial portion of the organic materials in the spent aqueous treatment liquors to produce a separable sludge; and a reverse osmosis unit to produce a concentrated solution of salts and a treated liquid phase.

The paper mill preferably also includes a filtration unit suitable for filtering the spent aqueous treatment liquors prior to subjecting the spent aqueous treatment liquors to oxidation, a microfiltration unit to remove any undissolved matter remaining in the liquid phase following biological treatment and an evaporation unit suitable to produce a solid waste product from the concentrated solution of salts.

Some treatments of spent liquors include combustion of the liquid at high temperatures to burn the organic components of the waste waters. However, where the waste waters include sizing agents and sizing agent byproducts such as sodium sulphate, combustion can give rise to unacceptable flue gases such as sulphides or oxides of sulphur. Thus this invention also avoids producing any unacceptable gaseous as well as liquid effluent and avoids the use of an expensive boiler for combustion.

BRIEF DESCRIPTION OF THE DRAWINGS

One embodiment of the present invention will now be described with reference to the schematic flow diagram of a paper mill as shown in FIG. 1. FIGS. 2, 3A and 3B (FIGS. 3A and 3B each show one half of a schematic flow diagram) show a flow diagram of the spent liquor treatment process.

DETAILED DESCRIPTION OF THE PREFERRED EMBODIMENTS

Figure 1:
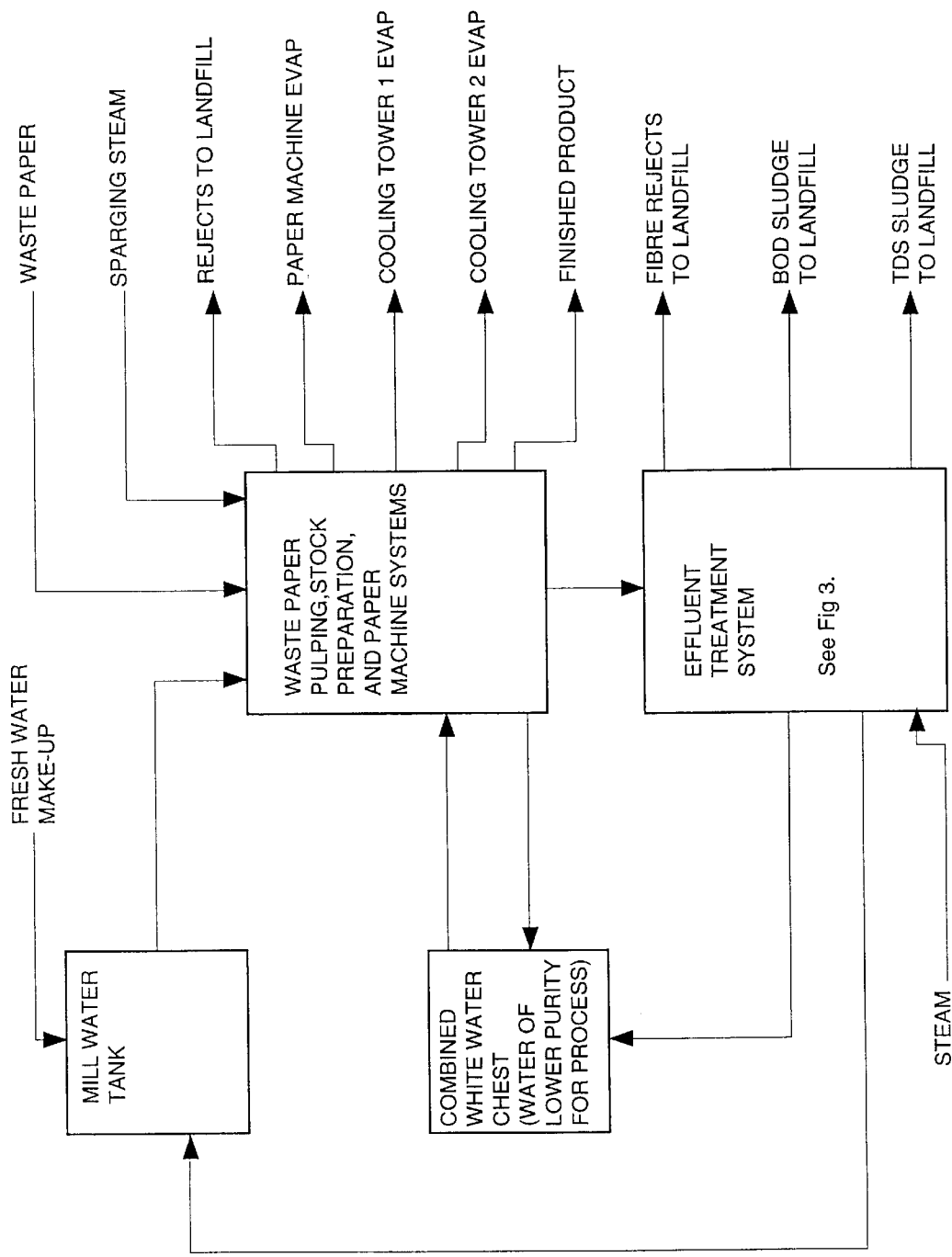
Figure 2:
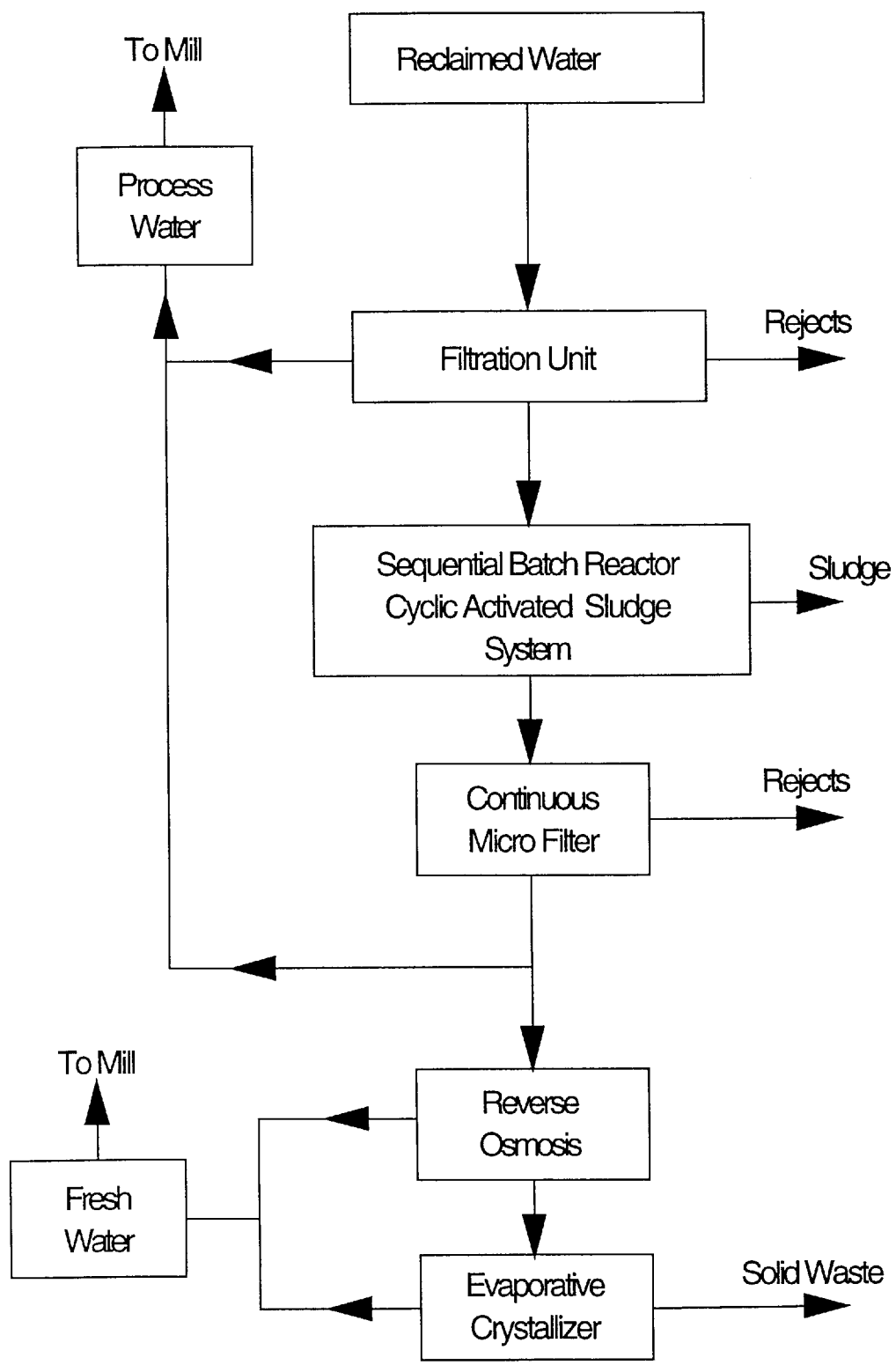

Referring more particularly to the flow diagrams of the drawings, a paper producing process is illustrated wherein no liquid streams are discharged.

The main mill process area comprises three main process systems. The first process system is for pulping of waste paper such as mixed domestic waste paper, old corrugated containers (OCC), container makers' (box makers') clippings, or a variety of white waste papers such as mixed office waste, printers waste and old newspapers and old magazines which generates a suspension of fibres in water, called "stock", which must be subjected to further processing to remove contaminants and to improve the bonding properties of the fibres, in order to ensure that paperboard with adequate appearance and strength properties can be manufactured.

The waste papers are generally reslushed in one of the dirtier recovered mill process water streams in a vessel known as a hydropulper. Temperature and mechanical agitation are generally sufficient to separate the bulk of the fibres. In some cases, for example in reslushing paperboards containing resins and other additives to enhance wet strength, sodium hydroxide may be added to break down the additives. Dispersants may also be added to disperse waxes and hot melt glues in a later dispersing step. When white waste papers are the raw material, sodium hydroxide, hydrogen peroxide and sodium silicate may also be added to the pulp in the hydropulper, particularly if de-inking is to be carried out at a later stage. In this case surfactant de-inking chemicals and calcium salts of long chain aliphatic fatty acids are usually added as well, the latter to collect the ink particles being liberated by the mechanical action. If de-inking is carried out, additional brightening stages, using sodium hydroxide and hydrogen peroxide (with silicates or chelants), formamidine sulphinic acid and/or sodium dithionite are frequently incorporated.

The second major process system for cleaning and refining the stock is called stock preparation. In the case of white waste papers, a de-inking plant may be included in the stock cleaning process. Stock preparation involves passage of the stock through a series of slotted, or hole pressure screens to remove from the stock particles which are larger than individual fibres; then through a series of high density (HD) and medium density (MD) liquid cyclones, which remove sequentially high specific gravity contaminants and low specific gravity contaminants from the stock; and then optionally through dispersers to reduce the particle size of any remaining wakes and glues; then through refiners which apply kinetic energy to the fibres in order to develop bonding characteristics, and finally into one or more chests for storage prior to use on the paper machine. At many intermediate stages during stock preparation, dilution or dewatering of the stock can occur in order to adjust the concentration of fibres per unit volume of water (the "consistency" of the stock) to a level which ensures either maximum efficiency of contaminant removal, or efficient transport to the next processing stage.

The third major process to which the stock is subjected is papermaking on a paper machine, where the stock is filtered through one or more moving woven fabrics, called "wires", to form a continuous single or multiple ply web of fibres, which is dried to form paper or paperboard. The paper pulp going forward to the paper machine is usually mixed with either rosin size (which may be partially catonised) and aluminium sulphate, or with synthetic sizes, such as alkyl ketene dimer (AKD), or alkenyl succinic anhydride (ASA), neither of which require aluminium ions for their sizing action. Other chemicals which may be added include cationic or amphoteric starches to enhance strength properties, various retention aids, cationic polymers which assist retention of mineral fillers and organic fines in the paper sheet, drainage aids (cationic polymers which facilitate the speed with which water can be removed from the sheet) and defoamers to prevent foam formation on the forming table of the machine or in the backwater chest under the machine.

Solid waste streams removed from the recycled fibre pulping system, and the stock preparation system are transferred to thickening devices and then to containers and are then transported directly to landfill disposal. All other waste streams are processed in the effluent treatment system, with resultant solid waste from the sludge belt press transported to landfill disposal and with cleaned and clarified water returned for re-use in the pulping and papermaking processes.

Two effluent streams flow from the main mill process areas to the effluent treatment system. One stream is pumped from the rejects tank in the recycled fibre pulping area. The second effluent stream is pumped from the mill U-drain system sump. A summary of the sources of individual effluents associated with reject streams in the OCC pulping and the stock preparation areas and from parts of the wet end of the paper machine is given in Tables 1A and 1B.

TABLE 1A

TYPICAL REJECTS HANDLED VIA
RECYCLE PULPING REJECTS TANK

| | Normal Flow | | |
|---|---|---|---|
| Rejects Source | oven dried tons per day | % fibre in water | liters per minute |
| Pressure screens and MD liquid cyclones in stock preparation area | 8.30 | 1.17 | 446.7 |

TABLE 1B

TYPICAL REJECTS HANDLED VIA U-DRAIN SUMP

| | Normal Flow | | |
|---|---|---|---|
| Rejects Source | oven dried tons per day | % fibre in water | liters per minute |
| Paper Machine Drum Screen for Reject Removal | 0.30 | 5.00 | 03.8 |
| MD Liquid Cyclones in Stock Preparation Area | 3.70 | 0.82 | 283.9 |
| Fresh Water Strainer | 0 | 0 | 0 |
| Strainer for High Pressure Showers on Paper Machine | 0 | 0 | 22.7 |
| Uhle Box Filter | 0 | 0 | 60.6 |
| Dilution Chest Overflow | 0 | 0 | 0 |

The effluent flow into the Recycled Fibre Rejects Tank is normally 8/1/454 oven dried tons per day / percent fibre in water / liters per minute (ODTPD/consistency/lpm), but the flow can vary over a very wide range, depending on the design capacity of the pulping, stock preparation and paper making equipment. The effluent flow into the U-Drain Sump is normally 4/1/370 ODTPD/consistency/lpm), but this can also vary over a very wide range, depending on the design capacity of the pulping, stock preparation and paper making equipment.

Figure 3B:
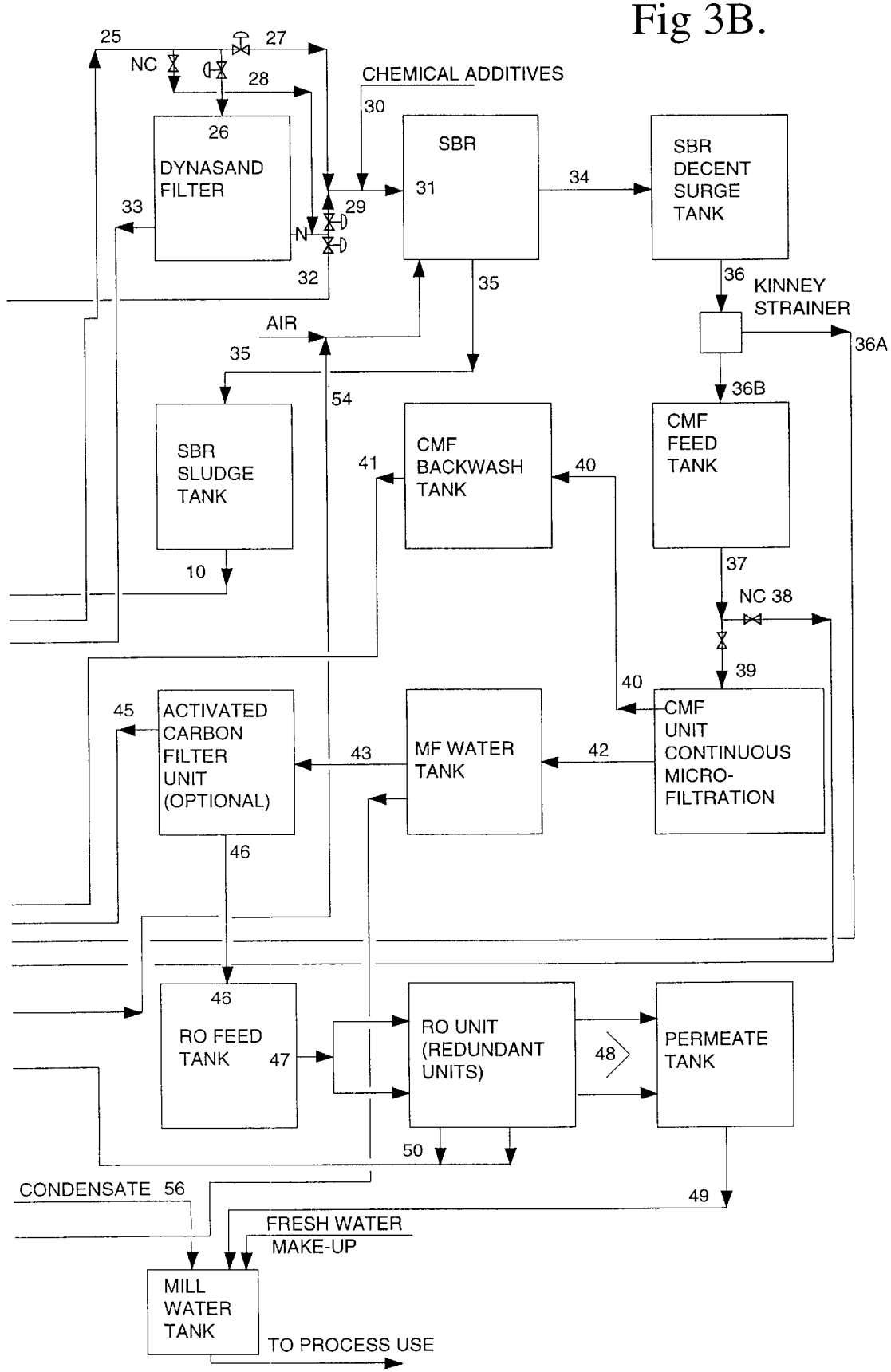

The two effluent streams from the mill are pumped to an effluent feed tank via two lines, one from the cleaner rejects tank and one from the U-drain sumps (see FIG. 3A). The effluent feed tank is equipped with an agitator and a level control system. The U-drain system provides surge volume capacity and is an integral part of the overall effluent feed flow and level control.

The U-drain sump is equipped with five lift pumps, with a total capacity of 1500 lpm (liters per minute), to transfer material to the effluent feed tank. These pumps can be operated automatically by level control or by manual control. A recirculation line from the lift pump discharge header continuously flushes the suction areas of the three lift pumps to prevent plugging of pump suctions.

Material from an effluent system backwash surge tank is pumped to the effluent feed tank to return the stream to the effluent treatment system for solids separation and water reclaim.

Discostrainer

Material from the effluent feed tank is transferred to a discostrainer (a rotating fabric disk screen) for initial separation of suspended solids. The discharge pump from the effluent feed tank is equipped with a variable frequency drive for control of feed rate to the discostrainer. Flow rate from the effluent feed tank to the discostrainer is modulated based on liquid level in the effluent feed tank. Because discostrainer operating stability is sensitive to variations in feed rate, the rate of change of feed rate to the discostrainer is restrained to about 190 lpm per minute.

As a means to achieve desired discostrainer rejects consistency, a remotely operated by-pass is provided to allow a portion of the feed to the discostrainer to be routed directly to the rejects outlet. After initial set-up, the by-pass does not require frequent adjustment.

Belt Press

Rejects from the discostrainer flow by gravity to a belt press feed box where this stream is combined with other belt press feed streams. Provisions are included to allow addition of chemical additives to the discostrainer rejects stream enroute from the discostrainer to the belt press feed box.

Reclaimed water tank

Accepts from the discostrainer flow by gravity to a reclaimed water tank. The reclaimed water tank may also receive the filtrate stream from the belt press, or this stream can be fed back to the effluent feed tank. The combined flow from the reclaimed water tank may be pumped, a mi a controlled rate to maintain tank level, as feed to a dissolved air flotation (DAF) clarifier. The discharge pump from the reclaimed water tank employs a variable frequency drive for flow rate control.

DAF Clarifier

Commencement of suspended solids separation from the process stream is by a DAF clarifier. A recirculation pump transfers liquid from the DAF clarifier vessel to an air dissolving tube where air is entrained in the stream, and the air-rich stream is returned to the DAF vessel.

Lightweight suspended solids float to the top of the DAF clarifier where they are skimmed off and transferred to a sludge rejects chamber for discharge. This material is discharged by gravity to a DAF sludge sump. Heavyweight suspended solids sink to the bottom of the DAF clarifier and are periodically purged to the DAF sludge sump. Material from the DAF sludge sump is pumped, at a controlled rate to maintain level in the sludge sump, to the belt press feed box. The discharge pump from the DAF sludge sump employs a variable frequency drive for flow rate control.

The accepts stream from the DAF clarifier is transferred by gravity to a DAF clear sump. The liquid is pumped, at a controlled rate to maintain sump level, from the DAF clear sump to a filtered water tank. The discharge pump from the DAF clear sump employs a variable frequency drive for flow rate control.

Filtered Water Tank

A low pressure shower pump transfers a constant flow portion of the water from the filtered water tank to the discostrainer for process showers. A high pressure shower pump transfers a constant flow portion of the water from the filtered water tank to the belt press for process showers. The balance of the water from the filtered water tank is pumped, at a controlled rate to maintain tank level, to the Dynasand® filter header. The discharge pump from the filtered water tank to the Dynasand® filter header employs a variable frequency drive for flow rate control.

Dynasand® Filter

The Dynasand® filter is a continuous backwash, upflow, deep-bed granular media filter (available from Parkson Corporation, Fort Lauderdale, Fla.).

Flow in the Dynasand® filter header is normally split to feed the combination of the Dynasand® filter and the sequential batch reactor (SBR) system. However, to provide flexibility to optimize the overall process and to accommodate equipment maintenance without mill production loss, the system is configured to allow:

All of the flow to by-pass the Dynasand® filter and go directly to the SBR system, or All of the flow to flow in series to the Dynasand® filter and then to the SBR system, or All of the flow to be processed through the Dynasand® filter with by-pass of the SBR system and all processes down-stream of the SBR system, or All of the flow to by-pass the Dynasand® filter and the SBR system, with all flow recirculated directly from the Dynasand® filter header to the combined white water chest for reuse in the recycle pulping and papermaking processes.

Under normal operating conditions, the flow from the Dynasand® filter header is split to maintain a minimum feed rate of 190 lpm to the Dynasand® filter, with the balance of the flow, up to a maximum of 1325 lpm, going to the SBR (sequential batch reactor) system for $BOD_5$ reduction. When the total flow rate in the Dynasand® filter header is greater than 1515 lpm, feed rate to the SBR system is controlled at 1325 lpm, with the balance of the flow going to the Dynasand® filter; when the total flow rate in the Dynasand® filter header is less than 1515 lpm, feed rate to the Dynasand® filter is maintained at 190 lpm, with the balance of the flow going to the SBR. There is also a provision for the feed to the Dynasand® filter to by-pass the filter directly to the Dynasand® filtered water standpipe for the return to the contaminated white water tank.

SBR System (Cyclic Activated Sludge System)

The SBR system consists of two batch reaction vessels which are operated sequentially to effect $BOD_5$ and COD reduction using mixed cultures of aerobic micro-organisms. The two reaction vessels are sequentially filled with effluent, which has a $BOD_5$ concentration typically in the range 500 to 2500 mg/L and a total suspended solids (TSS) concentration in the range 60 to 800 mg/L, from the Dynasand® filter header, and/or from the Dynasand® filter, and are held for batch reaction for a period of 8 to 16 hours at pH 7 to 8 at a temperature between 65°–100° F. in the presence of a mixed culture of aerobic non-filamentous microorganisms.

Special strains of bacteria are not used to inoculate the cyclic activated sludge system. In the process of reslushing the waste paper, a naturally occurring population of bacteria on the waste paper will be mixed with mill process waters also containing mixed bacteria from the air and from earlier batches of waste paper. These populations feed on the starch which is washed off the waste paper and a portion of them will be carried forward into the waste water treatment plant where conditions in the cyclic activated sludge system will encourage growth with concomitant BOD and COD removal. Bacteria and other slime-producing organisms are ubiquitous components of paper machine backwater systems. Excessive growth can cause odours, spray and pipe blockages and ultimately contamination of the paper sheet itself. For this reason, bacteriocides and slimicides are usually added to keep bacterial and slime levels to manageable levels.

During the reaction phase of the process, which lasts from 6 to 14 hours, high volume centrifugal blowers force air upward through the quiescent volume to effect oxidation. The concentration of dissolved oxygen in the waste water in the reaction vessel is maintained in the optimum range of 1 to 2 mg/l by means of a variable frequency drive on at least one of the air blowers under the control of a dissolved oxygen sensor. At the completion of the reaction period the passage of air is discontinued and the resulting bio-sludge is allowed to settle for a period of 1 to 2 hours under anaerobic conditions. The upper portion of the reaction volume is then decanted to the SBR decant surge tank. The bio-sludge formed during the reaction settles to the bottom of the reaction vessel and is pumped to the SBR sludge surge tank.

Sludge from the SBR sludge surge tank after optional further oxidation or lime stabilization is pumped to the belt press for dewatering. The pump from the SBR sludge surge tank employs a variable frequency drive to maintain flow rate based on tank level.

Decanted liquid from the SBR decant surge tank which is found to have a $BOD_5$ concentration in the range of 0 to 70 mg/l and a TSS concentration in the range 5 to 600 mg/l is continuously pumped via filters to the CMF (continuous microfilter) feed tank. The pump from the SBR decant surge tank employs a variable frequency drive to maintain flow rate based on tank level.

Under operating conditions in the SBR, some non-settling, filamentous bacterial populations can sometimes increase to a point where the TSS concentrations of the decanted liquid rise above 1000 mg/l, at which point the downstream continuous microfilter requires backwashing at an unacceptably high frequency. Under these conditions, the dissolved air filtration clarifier can be used temporarily to clarify the decanted water from the SBR. The dissolved air flotation clarifier is ideal for removing solid contaminants, which do not float and which do not settle, until control has been regained over the microbiological populations in the SBR and the liquid can be provided as a clear feed, with a TSS concentration below 600 mg/l to the CMF.

The CMF feed tank may be modified so that the lower portion of the tank can act as a stagnant zone to allow settling of the bulk of the precipitated material in order to minimize the separation load on the downstream CMF unit.

Enroute from the SBR decant surge tank to the CMF feed tank, a coarse strainer is employed to remove large entrained suspended particles. Continuous backwash from the coarse strainer is discharged to the backwash surge tank.

In order to precipitate metal-organic complexes in the liquid coming from the SBR decant surge tank, which will precipitate in the downstream reverse osmosis stage and damage the membranes, it is preferred that the pH of the liquid coming from the SBR decant surge tank be reduced to below 6.0 by the addition of hydrochloric acid or sulphuric acid under automatic pH control.

Provisions are included to allow the stream from the CMF feed tank to be temporarily diverted to the combined white water chest for complete closed-loop recirculation. This provision is included to allow short-term outages for maintenance of the downstream CMF unit, RO system, and crystallizer without stopping mill production processes.

Continuous Microfilter

The continuous microfilter unit (CMF) removes minute suspended particles and bacteria entrained in the feed stream and the precipitated metal-organic complexes from the previous pH adjustment stage. The CMF unit employs relatively high pressure drop across a polypropylene filtration membrane which is formed with bundles of hollow fibres, to accomplish the filtering process (available from Memtec America Corporation, Md.). The filtration membrane preferably has a pore size of about 0.2 micron although it can range from 0.1 micron up to 0.5 micron.

Backwash from the CMF unit is discharged to the CMF backwash tank, from which the material is continuously pumped to the backwash surge tank at a controlled rate to maintain level in the CMF backwash tank. The discharge pump from the CMF backwash tank employs a variable frequency drive for flow control.

The clean filtrate from the CMF unit, which has a TSS concentration in the range 0 to 3 mg/l, is discharged to the microfiltered (MF) water tank. From the MF water tank, the flow is split, with a constant flow portion of about 490 lpm of the highly filtered water treated for removal of dissolved solids and with the balance of between 150 and 300 lpm of the stream returned to the mill water tank for reuse in the recycle pulping and papermaking process.

The discharge pump from the MF water tank to the mill water tank employs a variable frequency drive for flow control. The flow rate is controlled to maintain level in the MF water tank.

The portion of the highly filtered water that is treated for removal of dissolved solids is pumped from the MF water tank to the reverse osmosis (RO) feed tank for further processing. If desired, an activated carbon filter unit may be included between the MF water tank and the RO feed tank to allow for further reduction of high molecular weight COD species which have not been adequately removed by the SBR system.

Reverse Osmosis

A reverse osmosis system is used to concentrate dissolved solids for subsequent removal. Typical total dissolved solids (TDS) concentrations in the RO feed tank are in the range of 500 to 5000 mg/l. The RO system includes fully redundant processing units to assure continuity of operation.

In the RO system, a relatively high pressure drop of about 37 bar across a semi-permeable separation membrane is used to produce a stream with high dissolved solids concentration and a stream that is virtually free of dissolved solids. The clean stream from the RO system is discharged to the permeate tank and from there to the mill water tank for reuse in the recycle pulping and papermaking process. The discharge pump from the permeate tank to the mill water tank employs a variable frequency drive to achieve flow control required to maintain level in the permeate tank. The stream with concentrated dissolved solids (brine) is discharged to the crystallizer system for removal of the dissolved solids.

Crystallizer

A crystallizer system is used for removal of dissolved solids from the feed stream. The crystallizer system employs a combination of heat and vacuum to evaporate the water from the feed stream, creating molten solids for disposal and water vapour for reclaim.

Molten solids from the crystallizer system are discharged as sludge for landfill disposal. On cooling below approximately 120° F., the discharged material forms rock-like solids for disposal.

Water vapour created in the evaporation process of the crystallizer system is condensed. The condensate is transferred to the mill water tank for reuse in the recycle pulping and papermaking processes.

What is claimed is:

1. In a paper mill which produces paper from waste paper by treating the waste paper with aqueous treatment liquors and recovering converted paper and spent treatment liquors, a method of treating the spent treatment liquors which enables the production of paper with the production of no liquid effluent from the paper mill, comprising:

subjecting the spent treatment liquors to a biological oxidative treatment which produces a sludge;

separating the liquid phase from the sludge;

subjecting the separated liquid phase to microfiltration;

subjecting the microfiltered separated liquid phase to reverse osmosis treatment;

and reusing all of the treated liquid phase to form fresh aqueous treatment liquor.

2. A method as claimed in claim 1 which includes the steps of:

removing suspended solids from spent treatment liquors;

optionally treating the spent treatment liquors in a clarifier;

passing the spent treatment liquors to a cyclic activated sludge reaction system for oxidative treatment which produces a sludge;

separating the liquid phase from the sludge;

subjecting the separated liquid phase to a continuous microfilter to remove suspended particles;

subjecting the microfiltered water to reverse osmosis treatment to concentrate dissolved solids and produce a treated liquid phase and a concentrated salt solution; and crystallizing the dissolved salts in an evaporation unit to produce a solid waste.

3. In a paper mill which produces paper from waste paper by treating the waste paper with aqueous treatment liquors and recovering converted paper and spent treatment liquors, a method of treating the spent treatment liquors which enables the production of paper with the production of no liquid effluent from the paper mill, comprising:

filtering the spent treatment liquors to remove suspended solids;

returning some of the filtered spent treatment liquors back to the paper production process and subjecting the remainder of the filtered spent treatment liquor to a biological oxidative treatment which produces a sludge;

separating the liquid phase from the sludge;

subjecting the separated liquid phase to microfiltration;

returning some of the microfiltered liquid phase to the paper production process and subjecting the remainder to reverse osmosis treatment wherein the treated liquid phase is returned to the paper production process.

4. In a paper mill for producing paper from waste paper in which no liquid effluent is produced which includes the steps of treating the waste paper with aqueous treatment liquors and recovering converted paper and spent treatment liquors, a system for treating the spent treatment liquors comprising:

a biological treatment unit to oxidize a substantial portion of the organic materials in the spent aqueous treatment liquors to produce a separable sludge;

a microfiltration unit to remove any undissolved matter remaining in the liquid phase exiting the biological treatment unit;

a reverse osmosis unit to produce a concentrated solution of salts and a treated liquid phase; and an evaporation unit suitable to produce a solid waste product from the concentrated solution of salts.

5. A system as claimed in claim 3 also comprising:

a filtration unit suitable for filtering the spent aqueous treatment liquors prior to subjecting the spent aqueous treatment liquors to oxidation.

* * * * *

UNITED STATES PATENT AND TRADEMARK OFFICE
CERTIFICATE OF CORRECTION

PATENT NO. : 5,849,197

DATED : December 15, 1998

INVENTOR(S) : Taylor et al.

It is certified that error appears in the above-identified patent and that said Letters Patent is hereby corrected as shown below:

On the title page,

[75] Inventor's address, "Albuquerque, N. Mex." should read --Balwyn, Victoria, Australia--.

[56] References Cited, OTHER PUBLICATIONS, line 7, "52-35261" should read --52-35461--.

Column 12, line 1, "claim 3" should read --claim 4--.

Signed and Sealed this

Twentieth Day of July, 1999

Attest:

Q. TODD DICKINSON

*Attesting Officer*

Acting Commissioner of Patents and Trademarks